(12) United States Patent
Ishiyama

(10) Patent No.: US 7,539,410 B2
(45) Date of Patent: May 26, 2009

(54) CAMERA SYSTEM, CAMERA BODY, AND LENS ASSEMBLY

(75) Inventor: Eiji Ishiyama, Asaka (JP)

(73) Assignee: Fujifilm Corporation, Tokyo (JP)

( * ) Notice: Subject to any disclaimer, the term of this patent is extended or adjusted under 35 U.S.C. 154(b) by 268 days.

(21) Appl. No.: 11/258,900

(22) Filed: Oct. 27, 2005

(65) Prior Publication Data

US 2006/0093346 A1  May 4, 2006

(30) Foreign Application Priority Data

Oct. 29, 2004 (JP) .............................. 2004-316361

(51) Int. Cl.
*G03B 17/18* (2006.01)
(52) U.S. Cl. ........................................ 396/287; 396/297
(58) Field of Classification Search .................. 396/57, 396/76, 88, 137, 131, 297, 148, 287
See application file for complete search history.

(56) References Cited

U.S. PATENT DOCUMENTS 5,432,584 A * 7/1995 Suzuki et al. .................. 396/86
2002/0012536 A1 * 1/2002 Kawano ....................... 396/287
2002/0118972 A1 * 8/2002 Uenaka et al. ............... 396/532

FOREIGN PATENT DOCUMENTS

JP          8-172561 A    7/1996
JP          2000-175089 A   6/2000

* cited by examiner

*Primary Examiner*—Melissa J Koval
*Assistant Examiner*—Autumn Parker
(74) *Attorney, Agent, or Firm*—Birch, Stewart, Kolasch & Birch LLP

(57) ABSTRACT

A camera system includes: a lens assembly and a camera body. The lens assembly has: an image-taking optical system, a storage section that stores screen information for display on an input screen, a screen transmission section that transmits the screen information, an information receiving section that receives the information entered according to the input screen, and a function execution section that executes a function according to the information received by the information receiving section. The camera body has: a connection section on which the lens assembly is detachably mounted, an image processing section that processes image data of the subject light image formed through the image-taking optical system, a screen receiving section that receives the screen information, a display input section that displays the input screen and receives information input according to the input screen, and an information transmitting section that transmits information entered through the display input section.

3 Claims, 8 Drawing Sheets

LENS ID : XXXXXXXXXXXX
CFA pattern : bayer or honey-comb
CCD pixel number (still picture) : vertical pixel number ×
Horizontal pixel number ($W_1, H_1$)
CCD pixel number (through picture) : vertical pixel number ×
Horizontal pixel number ($W_2, H_2$)
CCD pixel number (dynamic picture) : vertical pixel number ×
Horizontal pixel number ($W_3, H_3$)
Effective Taking-In position : start coordinates($X_4, X_4$),
Vertical pixel number × Horizontal pixel number ($W_4, H_4$)
OB position : start coordinates($X_{OB}$), length ($W_{OB}$)
Component Order : RGBG, BGRG, GBGR or GRGB
A/D Bit Depth : 8-14 bits/pixel
CCD damage position : coordinates ($X_{tn}, Y_{tn}$) ×
Max 256 pixels (n=0.255)

Fig. 3

CAMERA SYSTEM, CAMERA BODY, AND LENS ASSEMBLY

BACKGROUND OF THE INVENTION

1. Field of the Invention

The present invention relates to: a camera system comprising a lens assembly that is loaded with an image taking optical system for forming a subject light image, and a camera body on which the lens assembly is detachably mounted, the camera body applying a predetermined image processing to image data; the camera body constituting the camera system; and the lens assembly constituting the camera system.

2. Description of the Related Art

Hitherto, there is known an interchangeable lens digital camera in which an interchangeable image lens unit incorporating therein an image taking lens is mounted on a camera body incorporating an imaging device. According to the interchangeable lens digital camera, a subject light image formed by an image taking lens is fed to the imaging device provided on the camera body to create photographic image data. Accordingly, it is possible to reuse an interchangeable lens, which is used in a film type of single-lens reflex camera for recording a photographic image on a silver halide film.

However, for example, in the event that a large scale of image taking lens, which is excellent in an optical property, is mounted on a camera main body that incorporates therein a small type of imaging device that is low in resolution, while the image taking lens forms the subject light image with great accuracy, the imaging device cannot read the subject light image with great accuracy. This involves such a problem that it is difficult to make the best use of a property of the image taking lens. In order to solve the problem, there is developed an interchangeable head digital camera wherein a lens unit having an imaging device, which incorporates therein an image taking lens and an imaging device, that is, a camera head (hereinafter, the lens unit having the imaging device will be referred to as the camera head), is mounted on a camera body (cf. for example, Japanese Patent Application Laid Open Gazette TokuKai Hei. 8-172561 and Japanese Patent Application Laid Open Gazette TokuKai 2000-175089) According to the interchangeable head digital camera as mentioned above, a provision of CCD suitable for a size of the image taking lens and an optical property in the camera head beforehand makes it possible to obtain a high picture quality of photographic image through performing photography making the best use of the image taking lens. However, it is impossible for the interchangeable head digital camera to use an interchangeable lens for a film type of single lens reflex camera, different from an interchangeable lens digital camera.

By the way, according to the interchangeable lens digital camera and the interchangeable head digital camera as mentioned above, the lens unit and the camera body are provided with the associated CPUs, respectively. It is general that the lens unit CPU performs controls for lens drive processing to be carried out in the lens unit, and the camera body CPU performs obtaining of various sorts of information entered by a user in accordance with menu screens and the like, and image processing for photographic image.

Of the various types of processing to be carried out in the lens unit, there is one that needs a user's instruction as to parameters. The lens unit and the camera body each save a list that associates beforehand processing to be executed in the lens unit with various sorts of information necessary for displays of an input screen for inputting by a user parameters necessary for execution of the processing, or an input screen for inputting a sort of the parameters. For example, in the event that an adjustment of ISO speed is performed in the lens unit, first, the lens unit CPU informs the camera body CPU of execution of ISO speed adjustment processing. The camera body CPU obtains information of an input screen associated with the ISO speed adjustment processing of the previously saved list, and transmits data for an input screen, which is previously stored in the memory, to the display screen, so that the input screen is displayed. When the user inputs a parameter in accordance with the input screen displayed on the display screen, the camera body CPU transmits the entered parameter to the lens unit CPU, so that the lens unit CPU performs an adjustment of the ISO speed in accordance with the received parameter. In the manner as mentioned above, between the lens unit and the camera body, processing to be executed in the lens unit is associated beforehand with a sort of the parameter necessary for the execution of the processing. This feature makes it possible for the lens unit to execute processing according to the user's instruction.

However, according to the method as mentioned above, for example, in the event that the lens unit, which is loaded with a new function, is connected to the camera body, it is impossible for the camera body CPU to display an input screen for receiving an input a parameter necessary for an implementation of the new function, since the new function is not listed. Thus, even if the lens unit is loaded with various functions, when the functions are not listed, the user cannot use the functions.

SUMMARY OF THE INVENTION

In view of the foregoing, it is an object of the present invention to provide a camera system capable of receiving an input of information necessary for an implementation of a new function, even if lens assembly is loaded with the new function; a camera body constituting the camera system; and the lens assembly constituting the camera system.

To achieve the above-mentioned objects, the present invention provides a camera system comprising:

a lens assembly comprising an image taking optical system through which a subject light image passes, a storage section that stores screen information for display on an input screen through which information is entered, a screen transmission section that transmits the screen information stored in the storage section, an information receiving section that receives the information entered in accordance with the input screen represented by the screen information, and a function execution section that executes a predetermined function in accordance with the information received by the information receiving section; and a camera body comprising a connection section on which the lens assembly is detachably mounted, an image processing section that obtains image data representative of the subject light image formed through the image taking optical system of the lens assembly to be connected to the connection section and performs a predetermined image processing in accordance with the image data, a screen receiving section that receives the screen information, a display input section that displays the input screen represented by the screen information received by the screen receiving section and receives information input according to the input screen, and an information transmitting section that transmits information entered through the display input section.

According to the camera system of the present invention, the lens assembly stores beforehand the screen information for display on the input screen through which information necessary for execution of a predetermined function is entered, and when the function is executed, the screen information is transmitted from the lens assembly to the camera body. The camera body displays the input screen represented by the screen information transmitted from the lens assembly. When a user enters information in accordance with the input screen, the entered information is transmitted to the lens assembly. The lens assembly executes the function in accordance with the information transmitted from the camera body, so that a user can carry out photography on which the user's wish is reflected. Further according to the camera system of the present invention, there is no need for the camera body to store a list in which a function to be executed in the lens assembly is associated with information necessary for implementation of the function, and data for input screen. This feature makes it possible to suppress an amount of use for a memory of the camera body, and in addition, even if the lens assembly is loaded with a new function, it is possible to accept input of information necessary for implementation of the function from the user.

To achieve the above-mentioned objects, the present invention provides a camera body comprising:

a connection section on which a lens assembly is detachably mounted, the lens assembly having an image taking optical system through which a subject light image passes;

an image processing section that obtains image data representative of the subject light image formed through the image taking optical system to be connected to the connection section and performs a predetermined image processing in accordance with the image data;

a screen receiving section that receives the screen information for display on an input screen through which information is entered;

a display input section that displays the input screen represented by the screen information received by the screen receiving section and receives information input according to the input screen; and an information transmitting section that transmits information entered through the display input section.

According to the camera body of the present invention, there is no need to store data for the input screen, and thus it is possible to save an amount of use of a memory.

To achieve the above-mentioned objects, the present invention provides a lens assembly detachably mounted on a camera body that obtains image data representative of a subject light image and performs a predetermined image processing in accordance with the image data, the lens assembly comprising:

an image taking optical system through which the subject light image passes;

a storage section that stores screen information for display on an input screen through which information is entered;

a screen transmission section that transmits the screen information stored in the storage section;

an information receiving section that receives the information entered in accordance with the input screen represented by the screen information; and a function execution section that executes a predetermined function in accordance with the information received by the information receiving section.

According to the lens assembly of the present invention, even if the lens assembly is loaded with a new function, it is possible to surely accept an input of information necessary for implementation of the function.

BRIEF DESCRIPTION OF THE DRAWINGS

FIG. 3 is a view useful for understanding CCD information of camera head parameters.

DETAILED DESCRIPTION OF PREFERRED EMBODIMENTS

Embodiments of the present invention will be described with reference to the accompanying drawings.

Figure 1:
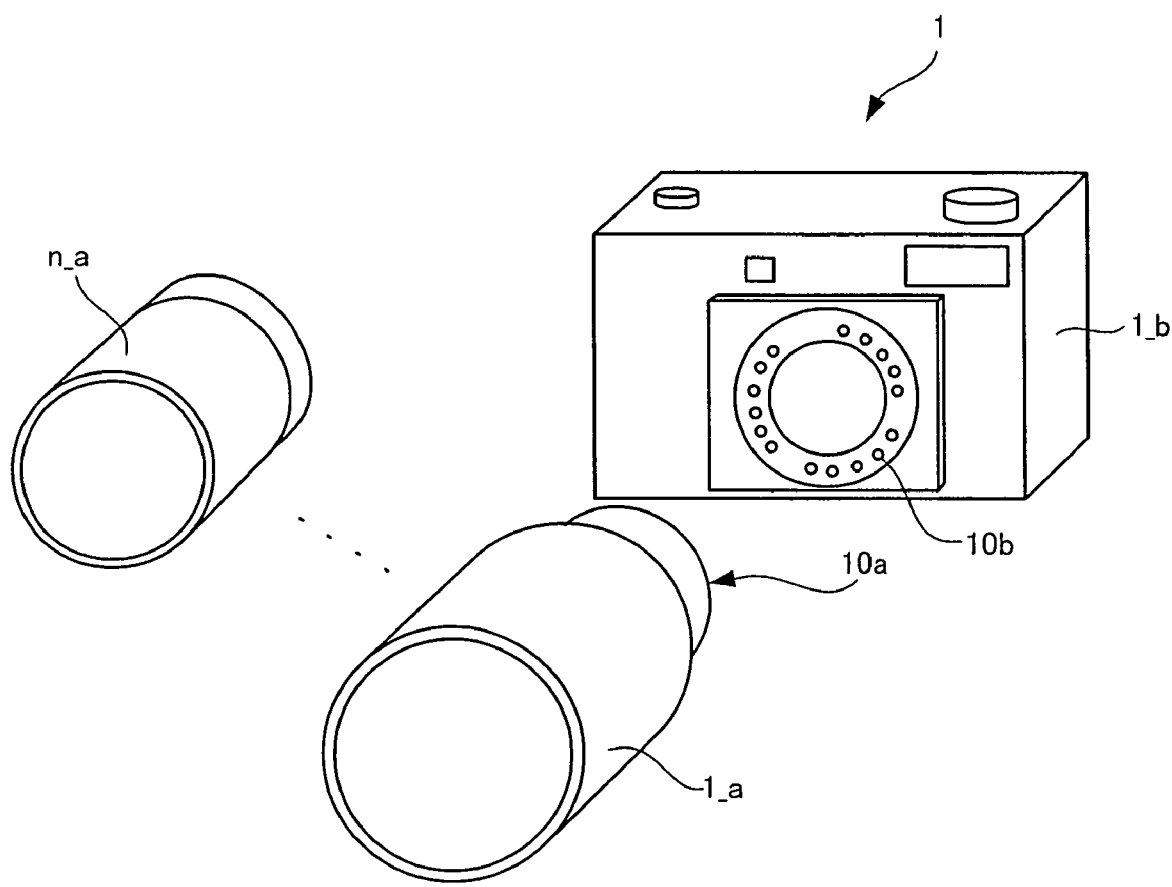
FIG. 1 is an exploded view of a camera system according to an embodiment of the present invention.

FIG. 1 is an exploded view of a camera system according to an embodiment of the present invention.

FIG. 1 shows a camera system 1 having a plurality of sorts of camera heads 1_a, 2_a, . . . , n_a each comprising an image taking lens and a CCD. In the camera system 1, any one of the pluralities of sorts of camera heads 1_a, 2_a, . . . , n_a is selectively used. In the following explanation, it is assumed that the camera head 1_a is typically selected.

The camera system 1 comprises the camera head 1_a and a camera body 1_b on which the camera head 1_a is detachably mounted. The camera heads 1_a, 2_a, . . . , n_a correspond to an example of the lens assembly referred to in the present invention. The camera body 1_b corresponds to an example of the camera body referred to in the present invention.

The camera head 1_a is provided with a head mounting connector 10a. The head mount connector 10a is detachably engaged with a main frame mount 10b provided in front of the camera body 1_b. The main frame mount 10b corresponds to an example of the connection section referred to in the present invention.

Figure 2:
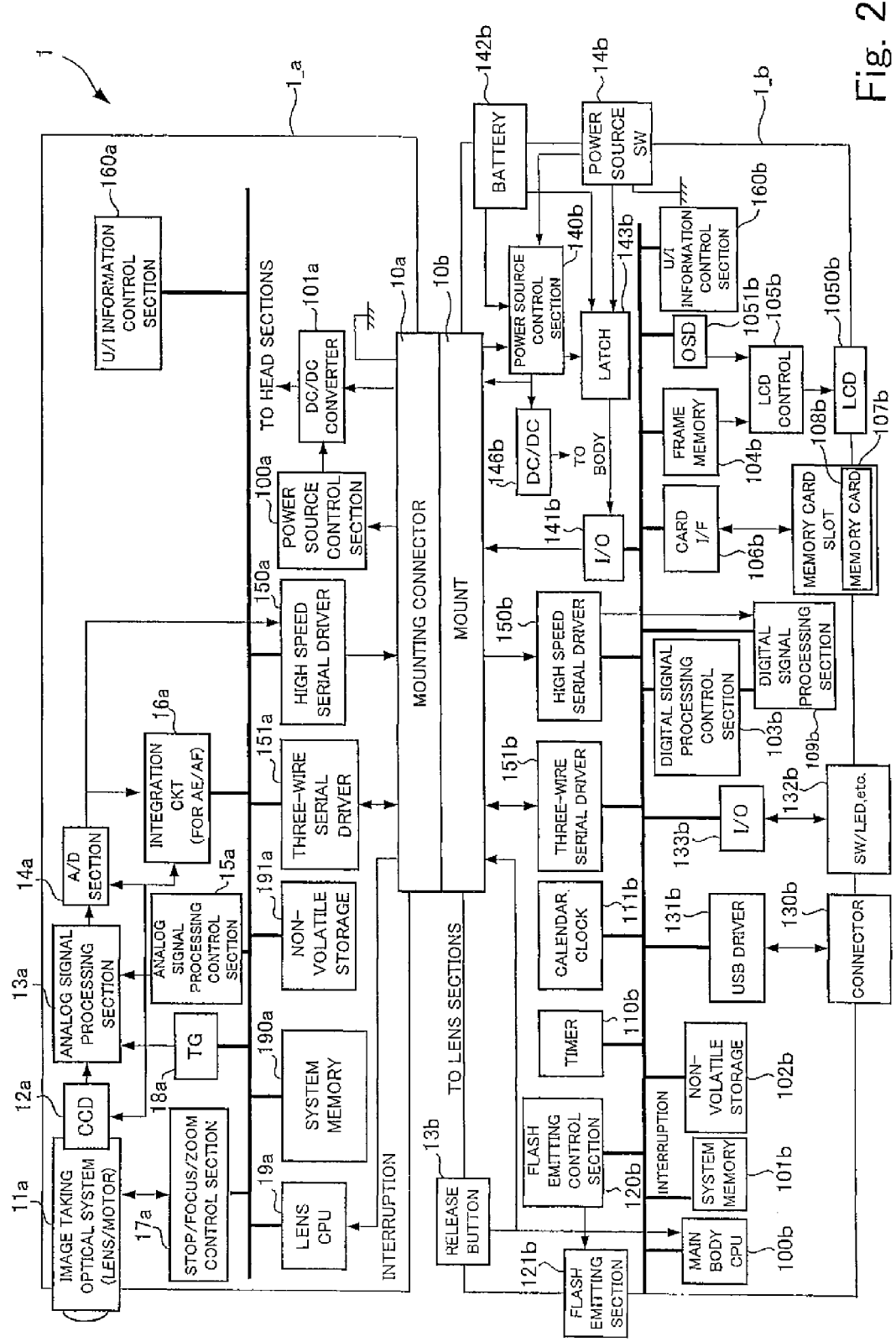
FIG. 2 is an internal structural view of the camera system 1 shown in FIG. 1.

FIG. 2 is an internal structural view of the camera system 1 shown in FIG. 1.

First, there will be explained the structure of the camera head 1_a.

The camera head 1_a comprises: an image taking optical system 11a that is provided with various sorts of lenses such as a focus lens and a zoom lens, and a motor for driving those lenses; a stop/focus/zoom control section 17a that controls the motor of the image taking optical system 11a to control a diameter of a stop of the image taking optical system 11a and positions of the focus lens and the zoom lens; a CCD 12a for receiving a subject light image formed through the image taking optical system 11a to create a subject signal representative of the subject light image; an analog signal processing section 13a for performing an amplification of the subject signal and a gain regulation; an A/D conversion section 14a for converting the subject signal of an analog signal to image data of digital; a TG (timing generator) 18a for generating a timing signal to the CCD 12a, the analog signal processing section 13a and the A/D conversion section 14a; a head CPU 19a for controlling each element of the camera head 1_a and for implementing various sorts of functions such as a computation of lens positions of the focus lens and the zoom lens, and an adjustment of an ISO speed of the CCD 12a; a system memory 190a that is used as a temporary memory for computation processing by the head CPU 19a; a non-volatile storage 191a that stores therein head parameters such as the number of pixels of the CCD 12a and the aperture value; and a U/I information control section 160a for controlling communications of screen information between the camera head 1_a and the camera body 1_b. The image taking optical system 11a corresponds to an example of the image taking optical system referred to in the present invention. The non-volatile storage 191a corresponds to an example of the storage section referred to in the present invention. The head CPU 19a corresponds to an example of the function execution section referred to in the present invention.

The camera head 1_a further comprises: a three-wire serial driver 151a; and a high speed serial driver 150a. The three-wire serial driver 151a serves to transmit between the camera head 1_a and the camera body 1_b information such as the camera head parameters and requests to the camera body 1_b. The three-wire serial driver 151a drives a three-wire serial bus to perform communications of the information. The high speed serial driver 150a serves to transmit between the camera head 1_a and the camera body 1_b photographic image data as to the subject light image. The high speed serial driver 150a drives a high speed serial bus to perform communications of the image data. The high speed serial driver 150a corresponds to an example of the image plane transmission section referred to in the present invention. The three-wire serial driver 151a corresponds to an example of the information receiving section referred to in the present invention.

In the camera head 1_a, when the CCD 12a receives the subject light image, the camera head 1_a creates three types of image data such as through image data for through image use as to the subject image now in the photographic view angle, which is to be displayed on the LCD 1050b of the camera body 1_b, still picture image data representative of a still picture image when a release button 13b is depressed, and dynamic picture image data representative of a dynamic picture image. The through image data is low in resolution and is a temporal data. Thus the high speed serial driver 150a transmits the through image to the camera body 1_b and also to an integration circuit 16a.

The camera head 1_a still further comprises: a power source control section 100a for controlling a power to be supplied to the integration circuit 16a for detecting luminance (AE detection) of the subject and contrast (AF detection) of the subject in accordance with the low resolution data, the system memory 190a for storing a program indicative of processing procedure as to the (AE detection) of the subject and contrast (AF detection), the camera head 1_a, and the various elements of the camera head 1_a, and a DC/DC converter 101a.

Next, there will be explained the camera body 1_b.

The camera body 1_b is controlled by a main frame CPU 100b. The camera body 1_b comprises: a system memory 101b that stores a program; a three-wire serial driver 151b for communicating information and various sorts of requests transmitted from the camera head 1_a; a high speed serial driver 150b for receiving image data transmitted from the camera head 1_a; a non-volatile storage 102b for storing various sorts of parameters received by the three-wire serial driver 151b; a timer 110b for timer photography; a calendar timer section 111b for displaying a calendar timer on the LCD 1050b; a USB driver 131b to which a personal computer and the like are connected via a USB connector 130b; a flash emitting section 121b for emitting flash through a flash emitting window provided on the camera body 1_b; a flash emitting control section 120b for controlling an amount of light emission by the flash emitting section 121b; a switch/LED 132B that is controlled by the main frame CPU 100b through an I/O 133b; a power source SW 14b for turning on and off a power source of the camera system 1; a battery 142b for supplying an electric power to the camera system 1; a power source control section 140b for controlling an electric power to be supplied from battery 142b to the respective elements of the camera body 1_b; a DC/DC converter 146b for regulating the electric power; a latch 143b that maintains and supplies the electric power via an I/O 141b to the camera head 1_a; a digital signal processing section 109b for applying various sorts of processing such as compression processing to the image data received by the high speed serial driver 150b; a digital signal processing control section 103b for controlling the digital signal processing section 109b; a frame memory 104b for temporarily storing the through image data received by the high speed serial driver 150b; an LCD control section 105b for controlling a display on the LCD 1050b; the image display section 1050b on which various menu screens and through images based on the through image data are displayed; a U/I information control section 160b for controlling communication of screen information between the camera head 1_a and the camera body 1_b; and a memory card slot 107b on which there may be mounted a memory card 108b in which image data created at the time of photography is compressed by the image processing section 109b, and the compressed image data is recorded via a card I/F 106b on the memory card 108b. The high speed serial driver 150b corresponds to an example of the screen receiving section referred to in the present invention. The three-wire serial driver 151b corresponds to an example of the information transmitting section referred to in the present invention. The digital signal processing section 109b corresponds to an example of the image processing section referred to in the present invention. A combination of the U/I information control section 160b and the LCD 1050b corresponds to an example of the display input section referred to in the present invention.

Now, an explanation of the elements of the camera system is interrupted, and there will be explained the camera head parameters stored in the non-volatile storage 191a of the camera head 1_a.

For example, the digital signal processing section 109b performs various sorts of image processing in accordance with image data that is obtained through reading the subject light image by the CCD12a of the camera head 1_a. At that time, there is needed various sorts of information as to the CCD12a (hereinafter, it is referred to CCD information). For this reason, when a user turns on the power source SW 14b, the three-wire serial drivers 151a and 151b transmit the camera head parameters stored in the non-volatile storage 191a of the camera head 1_a to the digital signal processing section 109b of the camera body 1_b.

Figure 4:
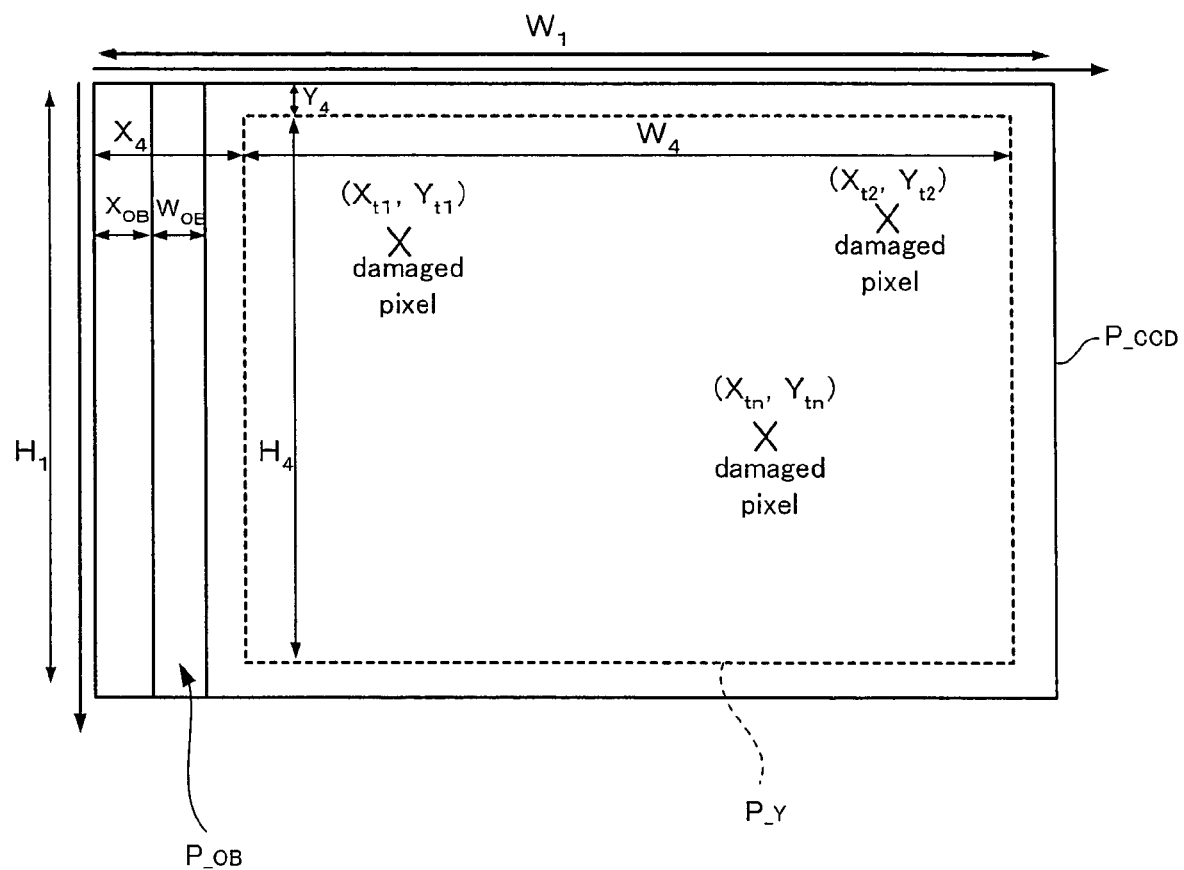
FIG. 4 is a view useful for understanding meaning of marks of the CCD information.

FIG. 3 is a view useful for understanding CCD information of camera head parameters. FIG. 4 is a view useful for understanding meaning of marks of the CCD information.

As the CCD information shown in FIG. 3, there are shown, in turn, a head ID for discriminating the camera head 1_a, an arrangement of a color filter array of the CCD12a, the number of pixels of the CCD12a (three ways of the case of the still picture image, the case of through image, and the case of dynamic picture image), the number of pixels and coordinates indicative of an effective taking-in position on the image taking plane of the CCD12*a*, coordinates indicative of an optical black (OB) position as the standard of the black level, the component order, a bit depth of A/D conversion (the number of bits for representing one pixel), and the number of damaged pixels of CCD.

Of the CCD information shown in FIG. 3, the number of pixels is expressed by a combination (W and H) of the number (W) of vertical pixels and the number (H) of horizontal pixels. As seen from FIG. 4, the number (W) of vertical pixels and the number (H) of horizontal pixels represent the number of pixels in the vertical direction and the number of pixels in the horizontal direction, respectively. A symbol W1 represents the maximum number of pixels in the width direction of an imaging plane P_CCD. A symbol H1 represents the maximum number of pixels in the height direction of the imaging plane P_CCD. In other words, for example, in the event that coordinates representative of the effective taking-in position are expressed by (W1, H1), it means that the pixels of the CCD 12*a* are used in its entirety.

On the imaging plane P_CCD of the CCD 12*a*, there is provided an area addressed as an optical black for informing the digital signal processing section 109*b* of the camera body 1_*b* side of the black level when photography is carried out through the CCD 12*a*. The CCD information indicates also initiation coordinates (XOB) and length (WOB) of the optical black area.

The CCD information further indicates coordinate positions (X, Y) of the damaged pixel according to the damaged position of the CCD 12*a*. According to the example shown in FIG. 4, it is understood that damaged pixels exist at three places of (Xt1, Yt1), (Xt2, Yt2), and (Xt3, Yt3).

The digital signal processing section 109*b* of the camera body 1_*b* side obtains the camera head parameter including such CCD information and performs processing according to the camera head parameter. For example, as shown in FIG. 4, in the event that the damaged pixels exist at three places of (Xt1, Yt1), (Xt2, Yt2), and (Xt3, Yt3), there is performed an interpolation processing using pixels adjacent to those pixels.

Now returning to the explanation for the elements of the camera system 1 there will be continued the explanation.

The camera system 1 shown in FIG. 2 comprises the camera head 1_*a* and the camera body 1_*b*, and is constructed in such a manner that the head mounting connector 10*a* is detachably connected to the camera body mount 10*b*. Between the camera head 1_*a* and the camera body 1_*b*, there are performed communications via electrical contacts provided on the head mounting connector 10*a* and the camera body mount 10*b*.

The camera system 1 according to the present embodiment is basically constructed as mentioned above.

According to the camera system 1 of the present embodiment, the head CPU 19*a* controls various sorts of processing to be executed in the camera head 1_*a*, and the camera body CPU 100*b* controls various sorts of processing to be executed in the camera body 1_*b*. Of the various sorts of processing to be executed in the camera head 1_*a*, there is processing that needs a parameter designation from a user.

Figure 5:
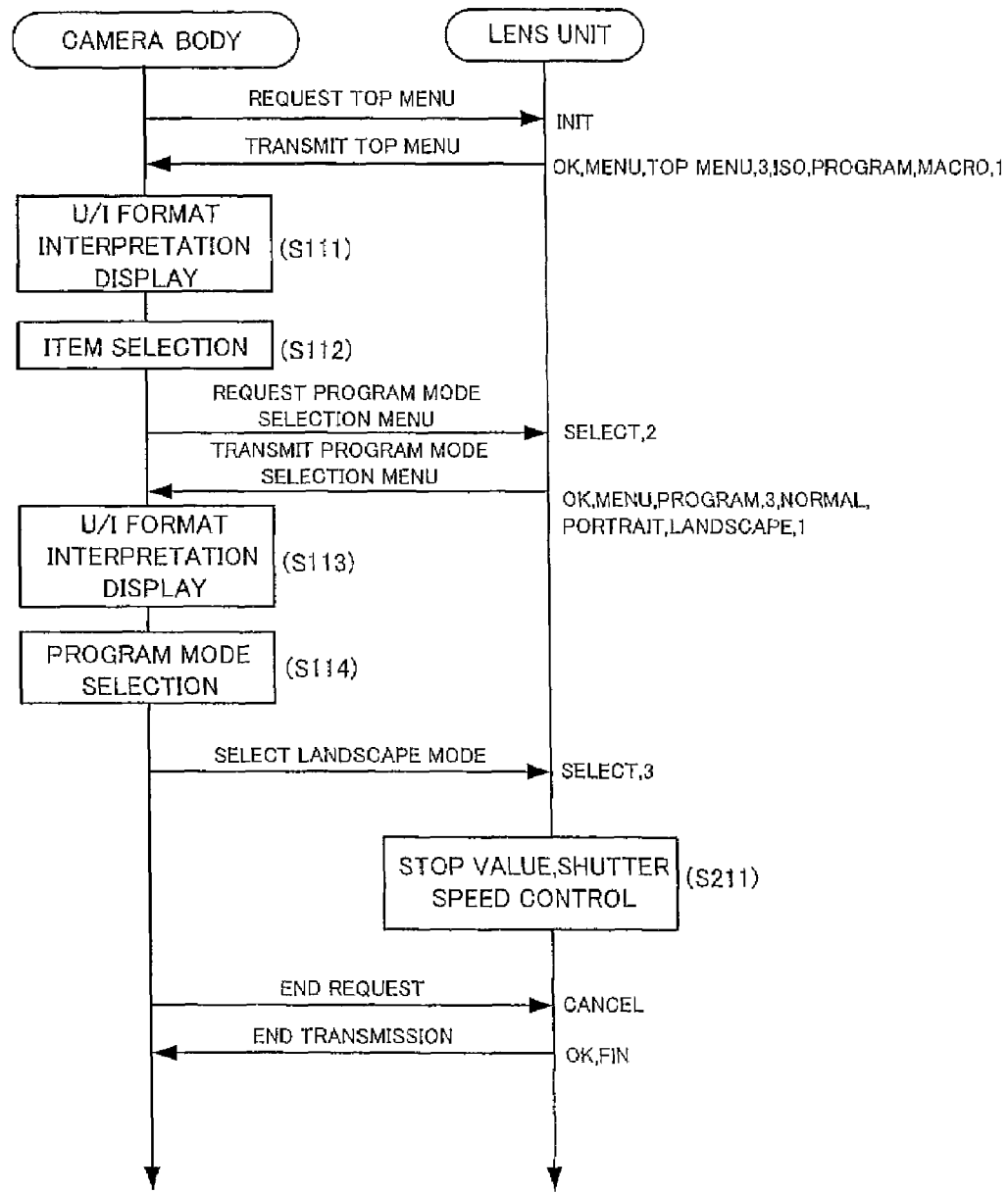
FIG. 5 is a flowchart useful for understanding a series of processing in the camera system 1 up to execution of the function in the camera head 1_a upon receipt of a user's instruction.

FIG. 5 is a flowchart useful for understanding a series of processing in the camera system 1 up to execution of the function in the camera head 1_*a* upon receipt of a user's instruction. The right of FIG. 5 shows data to be communicated between the camera head 1_*a* and the camera body 1_*b* when the respective processing is carried out.

According to the present embodiment, the non-volatile storage 102*b* of the camera body 1_*b* stores screen information for display on an input screen for entering information necessary for functions to be executed in the camera body 1_*b*, and the non-volatile storage 191*a* of the camera head 1_*a* stores screen information for display on an input screen for entering information necessary for execution of functions loaded on the camera head 1_*a*. According to the present embodiment, the input screen is established by a table, and the screen information is described with a predetermined format such as "order and response, a sort of the input screen, a title of the input screen, the number of items for information to be entered, 1st item, . . . , nth item, default item".

When a user turns on the power source SW 14*b* shown in FIG. 2, the U/I information control section 160*b* of the camera body 1_*b* transmits data for a menu screen, which is beforehand stored in the non-volatile storage 102*b*, via the frame memory 104*b* and the LCD control section 105*b* to the LCD 1050*b*. The LCD 1050*b* displays the menu screen in accordance with the transmitted data. On the menu screen, there may be selectively displayed, for example, items of "camera body information" and "camera head information".

When the user requests an entry of various sorts of information in accordance with the menu screen, the user's request is transmitted to the U/I information control section 160*b*. In the event that the user's request is concerned with functions to be executed in the camera body 1_*b*, in other words, when the "camera body information" is selected, the screen information, which is stored in the non-volatile storage 102*b*, is fed to the LCD 1050*b*, so that the LCD 1050*b* displays the input screen in accordance with the screen information.

In the event that the user's request is concerned with functions to be executed in the camera head 1_*a*, in other words, when the "camera head information" is selected, the U/I information control section 160*b* requests of the camera head 1_*a* that the camera head 1_*a* transmits the screen information for displaying the input screen. At that time, the U/I information control section 160*b* transmits a command addressed as an "INIT" to the U/I information control section 160*a*. The command "INIT" indicates a transmission request for the screen information for displaying the top menu screens.

The information transmitted from the U/I information control section 160*b* of the camera body 1_*b* is received via the three-wire serial drivers 151*a* and 151*b* by the U/I information control section 160*a* of the camera head 1_*a*.

The U/I information control section 160*a* of the camera head 1_*a* transmits, of the screen information stored in the non-volatile storage 191*a*, the screen information for displaying the top menu, to the U/I information control section 160*b* of the camera body 1_*b*. At that time, there is transmitted a command addressed as "OK, MENU, TOP MENU, 3, ISO, PROGRAM, MACRO, 1". This command indicates "a reply to the request: OK, a sort of the input screen represented by the transmitted screen information: MENU, a title of the input screen: TOP MENU, the number of items of information to be entered: 3, the first item: ISO, the second item: PROGRAM, the third item: MACRO, an item of the default: the first item".

The U/I information control section 160*b* of the camera body 1_*b* receives the screen information transmitted from the U/I information control section 160*a* of the camera head 1_*a* via the high speed serial drivers 150*a* and 150*b*.

The U/I information control section 160*b* of the camera body 1_*b* causes the LCD 1050*b* to display the input screen represented by the screen information in accordance with the format represented by the command of the screen information (step S111 of FIG. 5).

Figure 6:
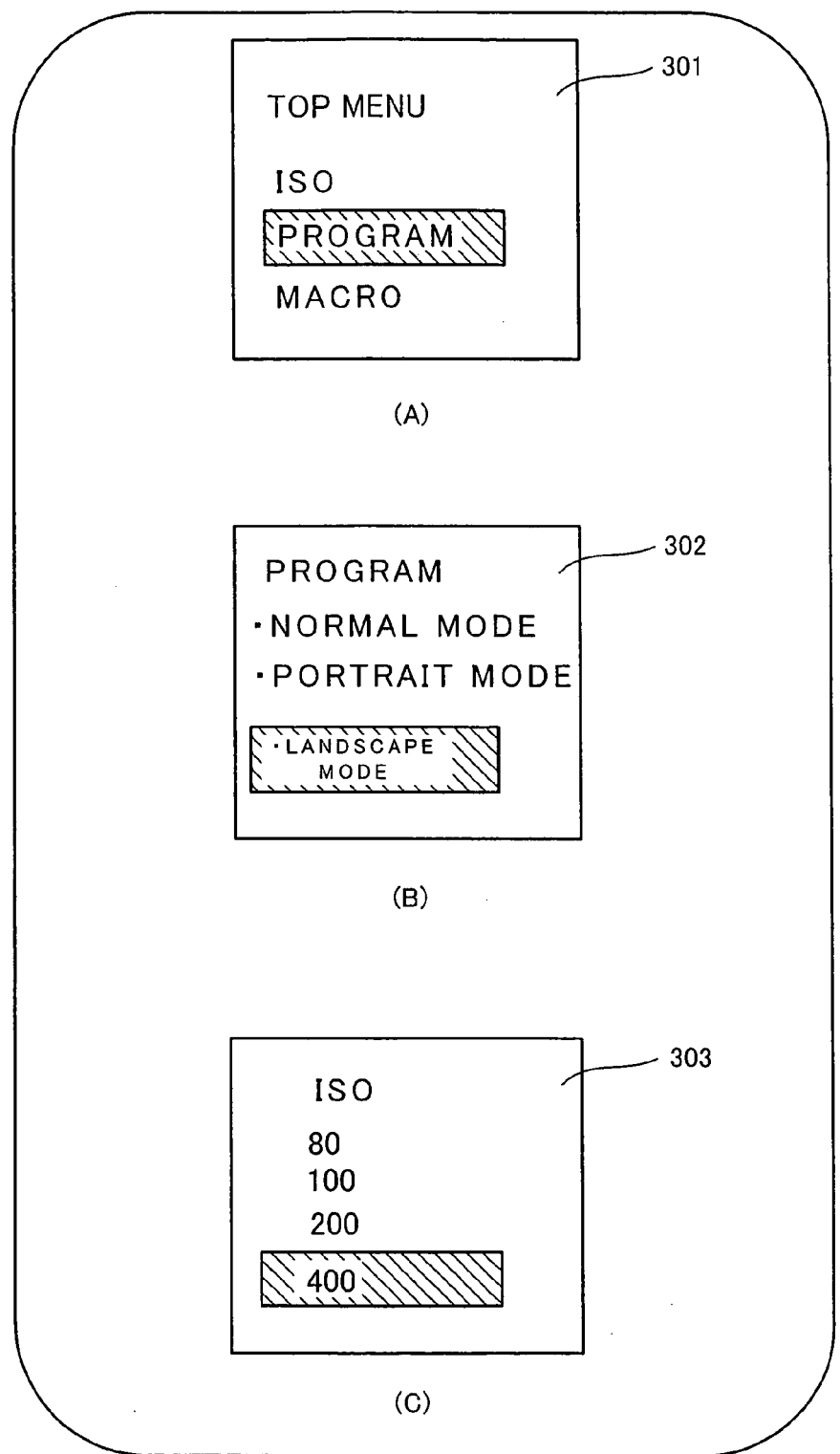
FIG. 6 is a view useful for understanding an input screen displayed on LED 1050b.

FIG. 6 is a view useful for understanding an input screen displayed on LED 1050*b*.

As seen from a part (A) of FIG. 6, in accordance with the command of the screen information, there is displayed an input screen 301 in which items "TOP MENU" in title, "ISO", "PROGRAM", and "MACRO" are indicated in the named order.

For example, when a user uses a "+" key (not illustrated) provided on the back of the camera body 1_b to select the item "PROGRAM" (step S112 of FIG. 5), the number of the selected item (according to this example, the item "PROGRAM" is the second item, and thus the number "2") is transmitted from the U/I information control section 160b of the camera body 1_b to the U/I information control section 160a of the camera head 1_a. At that time, the command addressed as "SELECT, 2" is transmitted. This command indicates that the second item is selected.

The U/I information control section 160a of the camera head 1_a receives the information transmitted from the U/I information control section 160b of the camera body 1_b via the three-wire serial drivers 151a and 151b.

Next, the U/I information control section 160a transmits, of the screen information stored in the non-volatile storage 191a, the screen information representative of input information for setting up the "PROGRAM", to the U/I information control section 160b of the camera body 1_b. At that time, there is transmitted a command addressed as "OK, MENU, PROGRAM, 3, NORMAL MODE, PORTRAIT MODE, LANDSCAPE MODE, 1". This command also indicates "a reply to the request: OK, a sort of the input screen represented by the transmitted screen information: MENU, a title of the input screen: PROGRAM, the number of items of information to be entered: 3, the first item: NORMAL MODE, the second item: PORTRAIT MODE, the third item: LANDSCAPE MODE, an item of the default: the first item".

The U/I information control section 160b of the camera body 1_b receives the screen information transmitted from the U/I information control section 160a of the camera head 1_a to cause the LCD 1050b to display the input screen represented by the screen information (step S113 of FIG. 5). At that time, as shown in a part (B) of FIG. 6, in accordance with the command of the screen information, there is displayed an input screen 302 in which items "PROGRAM" in title, "NORMAL MODE", "PORTRAIT MODE", and "LANDSCAPE MODE" are indicated in the named order.

When a user selects the item (step S114 of FIG. 5), the number of the selected item (according to this example, the third item is the landscape mode, and thus the number "3") is transmitted from the U/I information control section 160b of the camera body 1_b to the U/I information control section 160a of the camera head 1_a. At that time, the command addressed as "SELECT, 3" is transmitted. This command indicates that the third item is selected.

The U/I information control section 160a interprets it in view of the item number transmitted from the U/I information control section 160b of the camera body 1_b that a user designates the execution of the "landscape mode photography". An interpretation result is transmitted to the head CPU 19a. The head CPU 19a controls the stop/focus/zoom control section 17a and the TG 18a in accordance with a program diagram for a landscape mode, which is stored in the system memory 190a (S211 of FIG. 5). The landscape mode is a mode for the purpose of the overall photography wherein a landscape is photographed, and is controlled in accordance with a program diagram for a landscape mode, so that an aperture is previewed to provide a deeper depth of field.

The above-mentioned processing is continued until the user's selection of the function is completed.

When the user selects a set up completion button (not illustrated), the U/I information control section 160b of the camera body 1_b transmits a completion request ("CANCEL") to the U/I information control section 160a of the camera head 1_a. Upon receipt of the completion request, the U/I information control section 160a transmits a response ("OK, FIN") to the U/I information control section 160b.

When the various sorts of set up are completed, photography is carried out.

In this manner, according to the camera system 1 of the present embodiment, the camera body 1_b stores no screen information for the camera head 1_a, and thus it is possible to suppress an amount of use for memory of the camera body 1_b. Further, it is effective for the camera body 1_b to display items in accordance with the screen information transmitted from the camera head 1ea, without an interpretation of meaning of the items to be set up on the input screen, and directly transmit the item number selected by the user. And even if new screen information is added, according to the camera system 1 of the present embodiment, it is possible to display the new screen information on the LCD 1050b and transmit the information entered by the user to the camera head 1_a.

Next, there will be explained a case where functions of the camera head 1_a and the camera body 1_b are executed.

Figure 7:
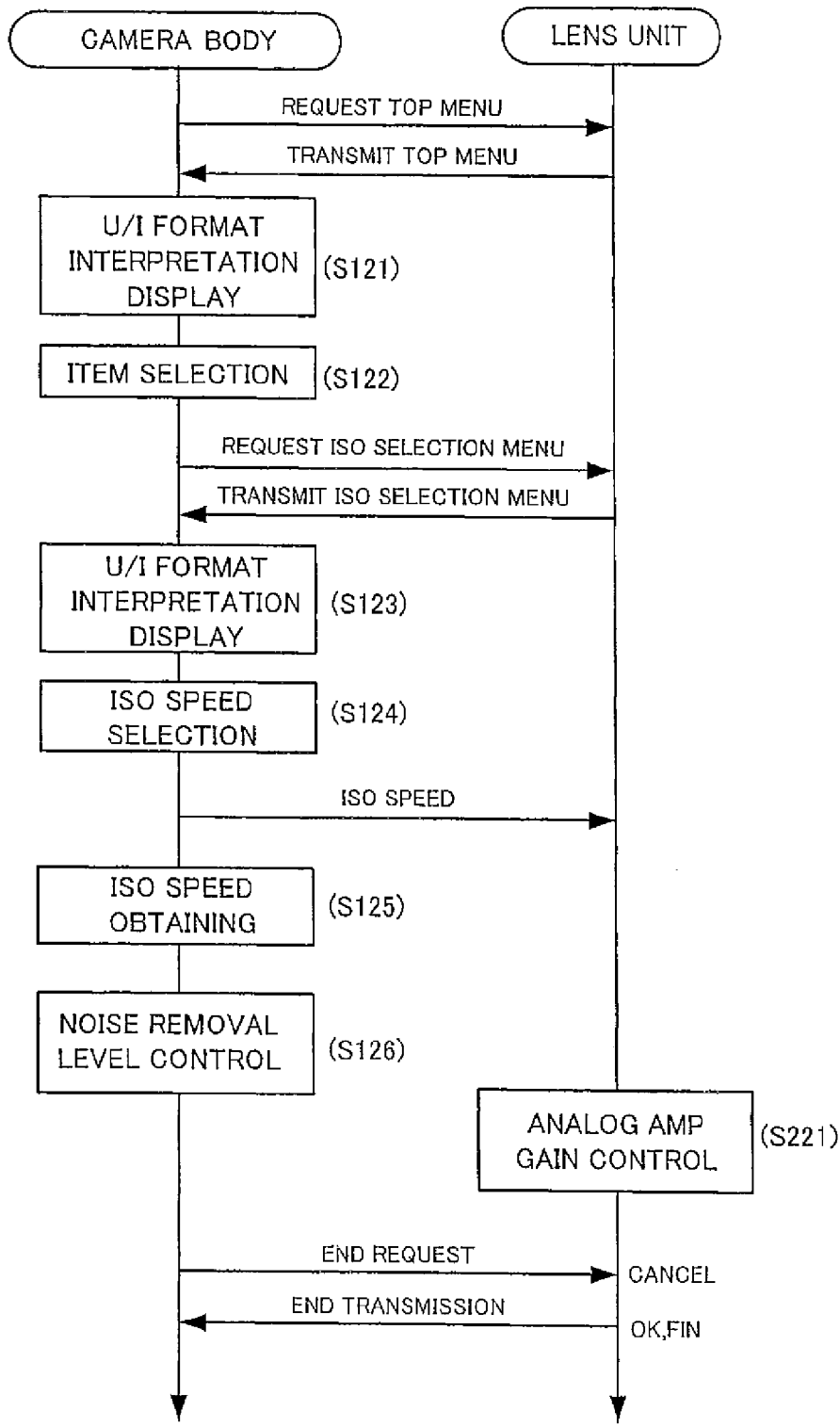
FIG. 7 is a flowchart useful for understanding a series of processing in the camera system 1 up to execution of the functions in the camera head 1_a and the camera body 1_b upon receipt of a user's instruction.

FIG. 7 is a flowchart useful for understanding a series of processing in the camera system 1 up to execution of the functions in the camera head 1_a and the camera body 1_b upon receipt of a user's instruction.

In accordance with a user's request, the U/I information control section 160b of the camera body 1_b requests of the camera head 1_a to send screen information for displaying the input screen.

The U/I information control section 160a of the camera head 1_a receives a request from the U/I information control section 160b of the camera body 1_b and transmits, of the screen information stored in the non-volatile storage 191a, the screen information for displaying the top menu, to the U/I information control section 160b of the camera body 1_b.

The U/I information control section 160b receives the screen information and displays on the LCD 1050b the input screen represented by the screen information (S121 of FIG. 7).

For example, when a user selects the item "ISO" on the input screen 301 shown in the part (A) of FIG. 6 (S122 of FIG. 7), the selected item number (according to the present example, the item "ISO" is the first item, and thus "1"), is transmitted from the U/I information control section 160b of the camera body 1_b to the U/I information control section 160a of the camera head 1_a.

Upon receipt of the selected item number, the U/I information control section 160a transmits, of the screen information stored in the non-volatile storage 191a, the screen information for display on the input information for performing set up of the item "ISO", and a request for obtaining the set up content, to the U/I information control section 160b of the camera body 1_b.

The U/I information control section 160b of the camera body 1_b receives the screen information and displays on the LCD 1050b the input screen represented by the screen information (S123 of FIG. 7).

For example, when a user selects the item "400" on the input screen 303 shown in the part (C) of FIG. 6 (S122 of FIG. 7), the selected item number (according to the present example, the item "400" is the fourth item, and thus "4"), is transmitted from the U/I information control section 160b of the camera body 1_b to the U/I information control section 160a of the camera head 1_a.

The U/I information control section 160a interprets it in view of the item number transmitted from the U/I information control section 160b of the camera body 1_b that a user designates the execution of the "ISO speed 400". An interpretation result is transmitted to the head CPU 19a. The head CPU 19a determines a gain value of an analog amplifier in accordance with ISO 400, so that an analog signal processing control section 15a is controlled in accordance with the determined gain value (S221 of FIG. 5).

In the camera body 1_b, the main frame CPU 100b obtains the information of the ISO 400 designated by the user in accordance with the request for obtaining the set up content transmitted together with the screen information (S125 of FIG. 5). In the main frame CPU 100b, a noise removal level is determined in accordance with the ISO 400, so that the digital signal processing section 109b is controlled in accordance with the determined noise removal level (S126 of FIG. 5).

In this manner, according to the functions implemented by both the camera body 1_b and the camera head 1_a, it is possible for both of them to obtain information designated by the user.

According to the present embodiment, between the camera body 1_b and the camera head 1_a, there is determined beforehand a format for describing screen information. In the camera body 1_b, a table is created through an interpretation of the screen information according to the format, and the table is displayed on the LCD 1050b in form of the input screen. However, it is acceptable that the screen information is transmitted from the camera head 1_a in the state of an image.

Figure 8:
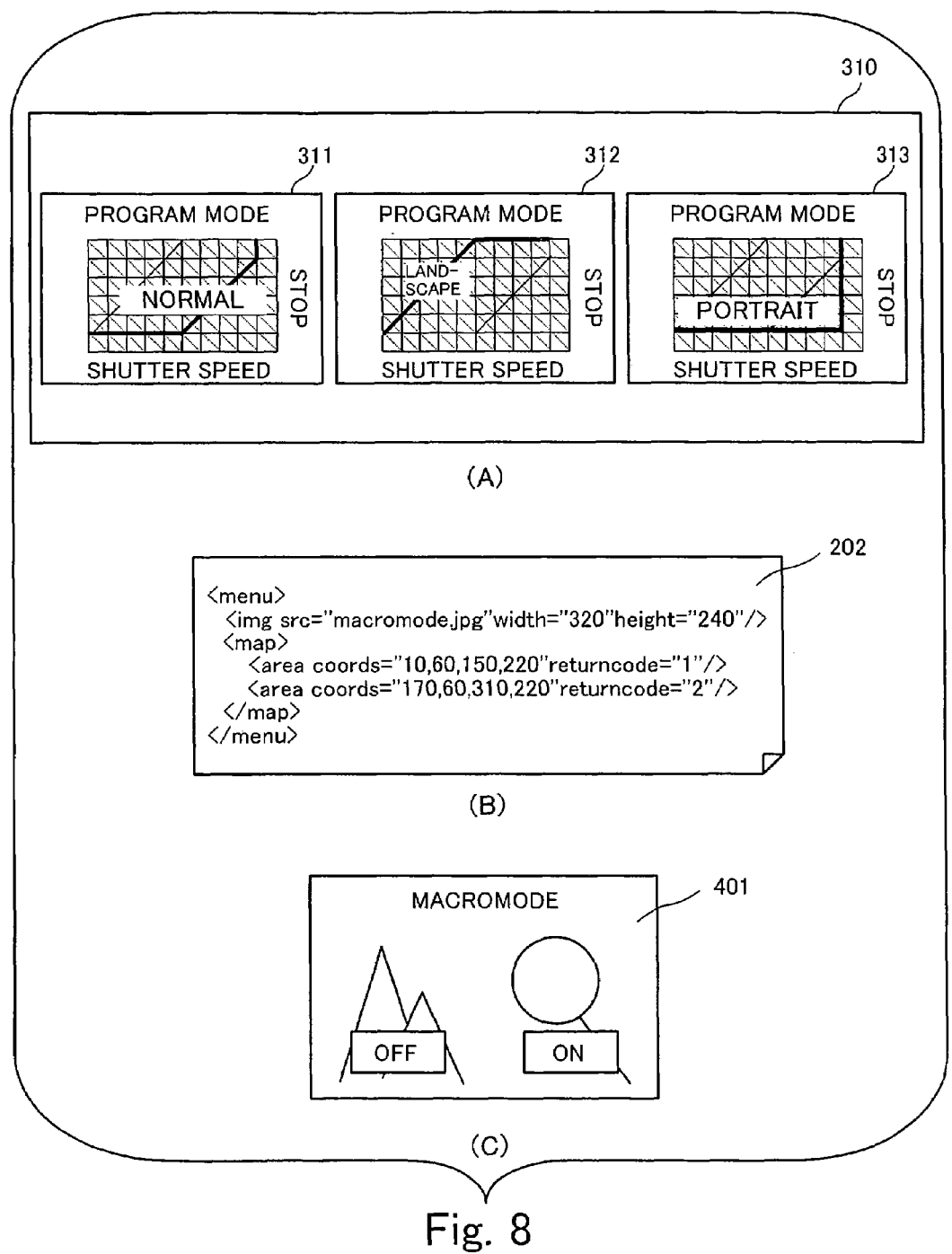
FIG. 8 is a view useful for understanding an example of image information.

FIG. 8 is a view useful for understanding an example of image information.

A part (A) of FIG. 8 is a conceptual view of image data 310 in which a normal mode diagram 311, a landscape mode diagram 312, and a portrait mode diagram 313 are selectable. When the image data 310 is transmitted from the camera head 1_a to the camera body 1_b, the camera body 1_b displays the images represented by the image data 310, that is, the normal mode diagram 311, the landscape mode diagram 312, and the portrait mode diagram 313. A part (B) of FIG. 8 is a conceptual view of character information 202 for displaying an input screen 401 of an image format shown in a part (C) of FIG. 8. The character information 202 is described in the XML language, for instance, and is analyzed in the camera body 1_b, so that the input screen 401 is displayed in accordance with the character information 202. In the part (A) of FIG. 8 and the part (C) of FIG. 8, when a user selects an image, the number of the selected image is transmitted to the camera head 1_a.

In this manner, also when the screen information is transmitted from the camera head 1_a in the state of an image, it is possible to display the input screen by the main frame CPU 100b and accept a user's designation for items.

According to the embodiments as mentioned above, there are explained the examples using the camera head in which the lens assembly incorporates therein the imaging device and the image taking optical system together. However, it is acceptable that the lens assembly referred to in the present invention includes no imaging device. In this case, it is acceptable that the imaging device is provided on the camera body, or alternatively, it is acceptable that the imaging device is provided on an adapter for connecting the camera body with the lens assembly.

Recently, there is developed a liquid lens in which a voltage is applied to a liquid accommodated in a vessel to vary the shape of a liquid surface so that a refractivity of a light is controlled. According to the present embodiments, there is explained the example in which the usual lens is used as the imaging optical system referred to in the present invention. However, it is acceptable that the imaging optical system referred to in the present invention is a liquid lens. In this case, what is meant by "drive of the imaging optical system" refers to a work for applying a voltage to a liquid so as to perform working equivalent to an effect that the usual lens is moved in the optical axis direction.

As mentioned above, according to the present invention, it is possible to provide a camera system capable of receiving an input of information necessary for an implementation of a new function, even if a lens assembly is loaded with the new function; a camera body constituting the camera system; and the lens assembly constituting the camera system.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A camera system comprising:
a lens assembly comprising an image taking optical system through which a subject light image passes, a storage section that stores screen menu information relating to properties of the lens assembly for display on an input screen, a screen menu transmission section that transmits the screen menu information stored in the storage section, an information receiving section that receives information that indicates a selected item from a screen menu displayed on the input screen, and a function execution section that executes a predetermined function in accordance with the information received by the information receiving section; and
a camera body comprising a connection section on which the lens assembly is detachably mounted, an image processing section that obtains image data representative of the subject light image formed through the image taking optical system of the lens assembly and performs a predetermined image processing in accordance with the image data, a screen menu information receiving section that receives screen menu information from the lens assembly, a display input section that displays the screen menu information received from the lens assembly on an input screen and enables selection of a menu item from the screen menu displayed on the input screen, and an information transmitting section that transmits to the lens assembly information indicating the selected menu item.

2. A camera body comprising:
a connection section on which a lens assembly is detachably mounted, the lens assembly having an image taking optical system through which a subject light image passes;
an image processing section that obtains image data representative of the subject light image formed through the image taking optical system and performs a predetermined image processing in accordance with the image data;
a screen receiving section that receives screen menu information from the lens assembly, the screen menu information indicating properties of the lens assembly;
a display input section that displays the screen menu information received from the lens assembly on an input screen and enables selection of information from the screen menu displayed on the input screen; and an information transmitting section that transmits information to the lens assembly indicating the selected item from the screen menu.

3. A lens assembly detachably mounted on a camera body that obtains image data representative of a subject light image and performs a predetermined image processing in accordance with the image data, the lens assembly comprising:

an image taking optical system through which the subject light image passes;

a storage section that stores screen menu information relating to properties of the lens assembly for display on an input screen;

a screen transmission section that transmits the screen menu information stored in the storage section to a camera body;

an information receiving section that receives information from the camera body indicating the screen menu item selected from the screen menu displayed on the input screen; and a function execution section that executes a predetermined function in accordance with the information received by the information receiving section.

* * * * *